United States Patent
Roh et al.

(10) Patent No.: US 10,829,584 B2
(45) Date of Patent: Nov. 10, 2020

(54) HIGH-RESILIENCY POLYURETHANE FOAM

(71) Applicant: BASF SE, Ludwigshafen am Rhein (DE)

(72) Inventors: Yeonsuk K. Roh, Canton, MI (US); Steven E. Wujcik, Ann Arbor, MI (US)

(73) Assignee: BASF SE, Ludwigshafen am Rhein (DE)

( * ) Notice: Subject to any disclaimer, the term of this patent is extended or adjusted under 35 U.S.C. 154(b) by 134 days.

(21) Appl. No.: 15/763,586

(22) PCT Filed: Sep. 19, 2016

(86) PCT No.: PCT/US2016/052490
§ 371 (c)(1),
(2) Date: Mar. 27, 2018

(87) PCT Pub. No.: WO2010/058551
PCT Pub. Date: Apr. 6, 2017

(65) Prior Publication Data
US 2018/0265622 A1  Sep. 20, 2018

Related U.S. Application Data

(60) Provisional application No. 62/234,363, filed on Sep. 29, 2015.

(51) Int. Cl.
| | |
|---|---|
| *C08G 18/18* | (2006.01) |
| *C08G 18/40* | (2006.01) |
| *C08G 18/48* | (2006.01) |
| *C08G 18/63* | (2006.01) |
| *C08G 18/76* | (2006.01) |
| *C08J 9/12* | (2006.01) |
| *C08G 101/00* | (2006.01) |

(52) U.S. Cl.
CPC ........... *C08G 18/632* (2013.01); *C08G 18/18* (2013.01); *C08G 18/1808* (2013.01); *C08G 18/1825* (2013.01); *C08G 18/1833* (2013.01); *C08G 18/4072* (2013.01); *C08G 18/4812* (2013.01); *C08G 18/4845* (2013.01); *C08G 18/7614* (2013.01); *C08G 18/7621* (2013.01); *C08G 18/7671* (2013.01); *C08J 9/125* (2013.01); *C08G 2101/0008* (2013.01); *C08G 2101/0083* (2013.01); *C08J 2205/06* (2013.01); *C08J 2375/04* (2013.01)

(58) Field of Classification Search
CPC ............ C08G 18/4072; C08G 18/4833; C08G 18/4837; C08G 18/4841; C08G 18/4845; C08G 18/485
See application file for complete search history.

(56) References Cited

U.S. PATENT DOCUMENTS

| | | | | |
|---|---|---|---|---|
| 4,379,105 | A * | 4/1983 | Taylor ................ | C08G 18/4804 264/45.5 |
| 5,340,916 | A * | 8/1994 | Henn ................. | C08G 18/4816 252/182.27 |
| 5,648,559 | A | 7/1997 | Hager | |
| 2010/0160473 | A1* | 6/2010 | Neff .................... | C08G 18/4845 521/159 |
| 2013/0143977 | A1* | 6/2013 | Villa .................. | C08G 18/3203 521/174 |
| 2015/0376332 | A1* | 12/2015 | Villa .................. | C08G 18/3203 521/174 |

FOREIGN PATENT DOCUMENTS

| | | | | |
|---|---|---|---|---|
| GB | 1089140 | A * | 11/1967 | ......... C08G 18/4804 |
| WO | 2012/112445 | A1 | 8/2012 | |

OTHER PUBLICATIONS

International Search Report and Written Opinion from corresponding International Application No. PCT/US2016/052490; dated Dec. 19, 2016.

* cited by examiner

*Primary Examiner* — Melissa A Rioja
(74) *Attorney, Agent, or Firm* — DLA Piper (US)

(57) ABSTRACT

A high-resiliency polyurethane foam comprises the reaction product of an isocyanate and an isocyanate-reactive component. The isocyanate-reactive component comprises a first polyether polyol in an amount of greater than about 5 parts by weight and a second polyether polyol in an amount of less than about 80 parts by weight, with parts by weight based on the total weight of the isocyanate-reactive component. The high-resiliency polyurethane foam has a resilience of about 45 to about 70% when tested in accordance with ASTM D3574-11. A method of forming a high-resiliency polyurethane foam includes the steps of providing the isocyanate and the isocyanate-reactive component and reacting the isocyanate and the isocyanate-reactive component.

19 Claims, No Drawings

HIGH-RESILIENCY POLYURETHANE FOAM

FIELD OF THE DISCLOSURE

The subject disclosure relates to a high-resiliency polyurethane foam and a method of forming the high-resiliency polyurethane foam.

DESCRIPTION OF THE RELATED ART

Flexible polyurethane foams made by the reaction of a polyol and an isocyanate in the presence of water as a blowing agent have been known for many years. The flexible polyurethane foams initially on the market had comparatively low resilience, and for some purposes it was desirable to supply foams having a greater resilience. Polyurethane foams with higher resilience, known in the art as high-resiliency ("HR") polyurethane foams, are particularly suitable for such purposes as upholstery, for example in beds, furniture, and car seats, as higher resilience gives greater comfort.

HR polyurethane foam is an open-cell, flexible polyurethane foam that has a less uniform (more random) cell structure that helps add support, comfort, and resilience or bounce. HR polyurethane foam has a high support factor and greater surface resilience. Further, HR polyurethane foam has a very fast recovery and bounces back to its original shape immediately after compression. HR polyurethane foam is typically molded and is characterized by high sag factors and improved hysteresis curves.

HR polyurethane foam generally has a resilience as measured by the ball rebound test of 50% minimum in ASTM D3574. If an HR polyurethane foam is subjected to a load which is increased to a maximum and then decreased and the results are plotted on a graph, a characteristic hysteresis curve is obtained. In addition to the 50% ball rebound test, the HR polyurethane foam preferably has a stress strain curve which does not show a plateau, and a quotient of compression hardness at 65% and 25% deformation of more than about 2. HR polyurethane foam having these physical properties (HR properties) typically provides excellent comfort and support properties in various bedding and seating applications.

Methods of making HR polyurethane foam are well known to those skilled in the art. Polyurethane foams are typically produced via the chemical reaction of polyols and polyisocyanates in the presence of water. As is well know in the art, HR polyurethane foams are typically produced via chemically reacting ethylene oxide ("EO")-capped polyols and polymer (graft) polyether polyols (e.g. styrene-acrylonitrile (SAN) copolymers grafted to a polyol chain) with isocyanate to produce HR polyurethane foam. Typically, a mixture of the 2,4 and 2,6 isomers of toluene diisocyanate (known in the art as TDI) and/or a mixture of polyphenylene polymethylene isocyanates made by condensing aniline with formaldehyde and converting the amine groups to isocyanate (known in the art as MDI) are used to produce HR polyurethane foams.

The faster reactivity of EO-capped polyols is necessary to meet required HR polyurethane foam properties. That said, polyols comprising a substantial proportion of primary hydroxy groups, i.e. EO-capped polyols, are required to produce HR polyurethane foam. An additional benefit of the EO-end cap/block is improved compatibility of these polyols with TDI and water. This EO end cap is mainly prepared by potassium hydroxide (KOH) catalysis which requires a filtration step to remove residual catalysts as well as to control reaction kinetics to achieve a sufficient degree of end blocking. The introduction of primary hydroxy groups increases the reactivity of the polyol. The reactivity of the polyol is important not only to obtain production of the foam in a short time but also because polyol reactivity affects the balance between the competing 5 reactions involved in polyurethane foam formation. In polyurethane foam production using water as a blowing agent the isocyanate reacts with the polyol to form urethane linkages. It also reacts with water to produce $CO^2$ gas which acts as a blowing agent. The relative rates at which these two reactions proceed is important.

As set forth above, in addition to ethylene oxide end-capped polyols, graft polyether polyols (e.g. styrene-acrylonitrile (SAN) copolymers grafted to a polyol chain) are often chemically reacted with isocyanate to produce HR foam. This combination of polyols (i.e., EO-capped polyols and graft polyether polyols) facilitates fast chemical reaction and forms a polyurethane foam having excellent tensile strength, elongation, and split-tear values. Both EO-capped polyols and graft polyols are more difficult to manufacture and, thus, more expensive than traditional polyols which are not end-capped or grafted.

Accordingly, it would be advantageous to provide an HR polyurethane foam composition that includes alternative polyols that are easier to manufacture and less expensive which can be chemically reacted with isocyanate to produce an HR polyurethane foam having excellent resilience and an excellent support factor.

SUMMARY OF THE DISCLOSURE AND ADVANTAGES

The subject disclosure provides a high-resiliency polyurethane foam comprising the reaction product of an isocyanate and an isocyanate-reactive component. The isocyanate-reactive component comprises a first and a second polyether polyol.

The first polyether polyol is present in the isocyanate-reactive component in an amount of greater than about 5 parts by weight based on the total weight of the isocyanate-reactive component. The first polyether polyol has a weight-average molecular weight of from about 3,500 to about 8,000 g/mol. Further, the first polyether polyol comprises from about 3.5 to about 25 parts by weight ethyleneoxy units based on the total weight of the first polyether polyol and greater than about 95% propyleneoxy end caps based on the total number of end caps in the first polyether polyol. The end caps of the first polyether polyol comprise from about 3.5 to about 20 parts by weight propyleneoxy units based on the total weight of alkyleneoxy units used to form the first polyether polyol.

The second polyether polyol, which is different from the first polyether polyol, is present in the isocyanate-reactive component in an amount of less than about 80 parts by weight based on the total weight of the isocyanate-reactive component. The second polyether polyol has a weight-average molecular weight of from about 2,000 to about 6,000 g/mol. Further, the second polyether polyol has about 100% ethyleneoxy end caps based on the total number of end caps in the second polyether polyol.

A method of forming the high-resiliency polyurethane foam is also provided. The method includes the step of providing the isocyanate and the isocyanate-reactive component comprising the first and second polyether polyols, as well as the step of reacting the isocyanate and the isocyanate-reactive component.

From a practical standpoint, the HR polyurethane foam of the subject disclosure provides excellent comfort and support properties over a broad range of temperatures and is durable. Further, the HR polyurethane foam composition includes alternative polyols that are easier to manufacture and less expensive which chemically react to form an HR polyurethane foam having excellent resilience and an excellent support factor.

DETAILED DESCRIPTION OF THE DISCLOSURE

The High Resiliency ("HR") polyurethane foam of the subject disclosure is particularly useful use in the furniture industry, e.g. for use in bedding and seating applications. In bedding applications, HR polyurethane foam can be used in mattresses, mattress toppers, pillows, or other bedding components. In seating applications, HR polyurethane foam can be used in cushions, pillows, seat covers, head rests, or other seating components. The HR polyurethane foam performs the necessary function of providing both comfort and support. The HR polyurethane foam contours to the body exceptionally well, and its cell structure enables extreme elasticity and optimal supporting force, distributing pressure across an entire surface, to block the transfer of motion. The elasticity of the HR polyurethane foam helps prolong the comfort life of furniture, i.e., helps a piece of furniture to retain its showroom level of comfort.

However, the HR polyurethane foam of the subject disclosure is not limited to use in furniture industries. As one example, the HR polyurethane foam is particularly suitable for use in sporting equipment, such as hockey or football equipment.

The HR polyurethane foam of the subject disclosure is a flexible foam. As used herein, the terminology "flexible polyurethane foam" denotes a particular class of polyurethane foam and stands in contrast to rigid polyurethane foam. Flexible polyurethane foam is generally porous, having open cells, whereas rigid polyurethane foam is generally non-porous, having closed cells and no rubber-like characteristics. In particular, flexible polyurethane foam is a flexible cellular product which will not rupture when a specimen 200 mm by 25 mm by 25 mm is bent around a 25-mm diameter mandrel at a uniform rate of 1 lap in 5 seconds at a temperature between about 18 and about 29° C., as defined by ASTM D3574-03.

Further, polyol selection impacts the stiffness of polyurethane foams. Flexible polyurethane foams are typically produced from polyols having weight average molecular weights from about 1,000 to about 10,000 g/mol and hydroxyl numbers from about 10 to about 200 mg KOH/g. In contrast, rigid polyurethane foams are typically produced from polyols having weight average molecular weights from about 250 to about 700 g/mol and hydroxyl numbers from about 300 to about 700 mg KOH/g. Moreover, flexible polyurethane foams generally include more urethane linkages as compared to rigid polyurethane foams, whereas rigid polyurethane foams may include more isocyanurate linkages as compared to flexible polyurethane foams. Further, flexible polyurethane foams are typically produced from low-functionality (f) initiators, i.e., f<4, such as dipropylene glycol (f=2) or glycerine (f=3). By comparison, rigid polyurethane foams are typically produced from polyols having high-functionality initiators, i.e., f≥4, such as Mannich bases (f=4), toluenediamine (f-=4), sorbitol (f=6), or sucrose (f=8). Additionally, as known in the art, flexible polyurethane foams are typically produced from glycerine-based polyether polyols, whereas rigid polyurethane foams are typically produced from polyfunctional polyols that create a three-dimensional cross-linked cellular structure, thereby increasing the stiffness of the rigid polyurethane foam. Finally, although both flexible polyurethane foams and rigid polyurethane foams include cellular structures, flexible polyurethane foams typically include more open cell walls, which allow air to pass through the flexible polyurethane foam when force is applied as compared to rigid polyurethane foams. As such, flexible polyurethane foams typically recover shape after compression. In contrast, rigid polyurethane foams typically include more closed cell walls, which restrict air flow through the rigid polyurethane foam when force is applied. Therefore, flexible polyurethane foams are typically useful for cushioning and support applications, e.g. furniture comfort and support articles, whereas rigid polyurethane foams are typically useful for applications requiring thermal insulation, e.g. appliances and building panels.

As used herein, the terminology "HR polyurethane foam" denotes a particular class of polyurethane foam and stands in contrast to other flexible polyurethane foams, e.g. conventional flexible polyurethane foams, viscoelastic polyurethane foam.

The HR polyurethane foam of the subject disclosure is defined herein as having a resilience of from about 45 to about 70, alternatively from about 48 to about 60, alternatively from about 49 to about 55, % when tested in accordance with ASTM D3574-11, and/or a support factor of greater than about 2, alternatively between about 2 and about 3.5, alternatively from about 2.3 to about 2.7, when tested in accordance with ASTM D3574. The support factor, sometimes referred to as compression modulus, is determined by taking the ratio of the foam's IFD at about 25 percent indentation and about 65 percent indentation. The support factor of flexible polyurethane foams typically falls in a range of from about 1.8 to about 3.0. A conventional flexible polyurethane foam that has a 25 percent IFD of about 30 pounds and a 65 percent IFD of about 60 pounds, has a support factor of about 2 which is typical of most conventional polyurethane foams. Of course, the subject HR polyurethane foam has a higher support factor, typically a support factor of greater than about 2, alternatively between about 2 and about 3.5.

The support factor of the HR polyurethane foam disclosed herein is dependent on density. The HR polyurethane foam of the subject disclosure has a density of greater than about 1.5, alternatively from about 1.5 to about 10, alternatively from about 1.5 to about 8, alternatively from about 1.5 to about 6, alternatively from about 1.5 to about 4, alternatively from about 1.5 to about 3, alternatively from about 1.5 to about 2.5, lb/ft$^3$ (PCF). Further, the support factor of the HR polyurethane foam disclosed herein is also impacted by the physical (e.g. cell structure) and chemical properties of the foam. The physical properties of the HR polyurethane foam are a function of the isocyanate and the isocyanate reactive component used to make the foam, as well as a function of the method of making the foam. The isocyanate, the isocyanate reactive component, and the method of making the foam are described in detail further below.

Further, the HR polyurethane foam of the subject disclosure exhibits excellent physical properties at standard use temperatures. More specifically, at 21° C., the HR polyurethane foam typically has: a tensile strength of greater than about 10, alternatively greater than about 15, alternatively from about 10 to about 30, alternatively from about 12 to about 22, PSI when tested in accordance with ASTM D3574-11; a graves tear of from about 1 to about 20, alternatively from about 1 to about 10, alternatively from about 2 to about 5, pounds per inch ("PPI") when tested in accordance with ASTM D3574-11; an elongation of greater than about 70, alternatively greater than about 75, alternatively from about 70 to about 300, alternatively from about 70 to about 100, alternatively from about 75 to about 90, % when tested in accordance with ASTM D3574-11; a 25% indentation force deflection (25% IFD) from about 10 to about 80, alternatively from about 25 to about 35, lbs/50 in$^2$ on a four inch thick test sample when tested in accordance with ASTM D3574-11; a 65% indentation force deflection (65% IFD) from about 30 to about 100, alternatively from about 70 to about 90, lbs/50 in$^2$ on a four inch thick test sample when tested in accordance with ASTM D3574-11; a resilience of from about 45 to about 70, alternatively from about 48 to about 60, alternatively from about 49 to about 55, % when tested in accordance with ASTM D3574-11.

Regarding porosity and air flow, the HR polyurethane foam typically exhibits excellent air flow when measured for porosity according to a Frazier air flow test set forth in ASTM D3574/D737. The Frazier air flow test measures the ease with which air passes through the flexible polyurethane foams. The air flow test consists of clamping a sample over an open chamber and creating a specified constant air-pressure differential. The air-flow value is the rate of air flow, in cubic feet per minute per square foot, required to maintain the constant air-pressure differential. The flexible polyurethane foam article typically has an air flow value of greater than about 50, alternatively from about 50 to about 250, alternatively from about 75 to about 200, cfm/ft$^2$.

The HR polyurethane foam comprises the reaction product of an isocyanate and an isocyanate-reactive component. The isocyanate and the isocyanate-reactive component are collectively referred to as a polyurethane system. Typically, the polyurethane system is provided in two or more discrete components, such as the isocyanate and the isocyanate-reactive (or resin) component, i.e., as a two-component (or 2K) system, which is described further below. It is to be appreciated that reference to the isocyanate and the isocyanate-reactive component, as used herein, is merely for purposes of establishing a point of reference for placement of the individual components of the polyurethane system, and for establishing a parts by weight basis. As such, it should not be construed as limiting the present disclosure to only a 2K system. For example, the individual components of the polyurethane system can all be kept distinct from each other.

The isocyanate can include one or more different types of isocyanate. That is, a mixture of different isocyanates (e.g. a mixture of diphenylmethane diisocyanate (MDI) and polymeric diphenylmethane diisocyanates (pMDI) can be reacted with the isocyanate-reactive component. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (PMDIs), toluene diisocyanates (TDIs), hexamethylene diisocyanates (HDIs), isophorone diisocyanates (IPDIs), and combinations thereof.

The isocyanate may include an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare HR polyurethane foam include, but are not limited to, toluene diisocyanate: 4,4'-diphenylmethane diisocyanate; m-phenylene diisocyanate: 1,5-naphthalene diisocyanate: 4-chloro-1; 3-phenylene diisocyanate; tetramethylene diisocyanate; hexamethylene diisocyanate; 1,4-dicyclohexyl diisocyanate; 1,4-cvclohexyl diisocyanate, 2,4,6-toluylene triisocyanate, 1,3-diisopropylphenylene-2,4-dissocyanate: 1-methyl-3,5-diethylphenylene-2,4-diisocyanate; 1,3,5-triethylphenylene-2,4-diisocyanate; 1,3,5-triisoproply-phenylene-2,4-diisocvanate; 3,3'-diethyl-bisphenyl-4,4'-diisocyanate: 3,5,3',5'-tetraethvl-diphenylmethane-4,4'-diisocyanate; 3,5,3',5'-tetraisopropyldiphenylmethane-4,4'-diisocyanate: 1-ethyl-4-ethoxy-phenyl-2,5-diisocyanate; 1,3,5-triethyl benzene-2,4,6-triisocyanate: 1-ethyl-3,5-diisopropyl benzene-2,4,6-triisocyanate and 1,3,5-triisopropyl benzene-2,4,6-triisocyanate. The HR polyurethane foam can also be prepared from aromatic diisocyanates or isocyanates having one or two aryl, alkyl, aralkyl or alkoxy substituents wherein at least one of these substituents has at least two carbon atoms.

In various embodiments, the isocyanate comprises, consists essentially of, or consists of MDI. In one embodiment the HR polyurethane foam of the instant disclosure includes the reaction product of only MDI and the isocyanate-reactive component. This embodiment is substantially free of (comprises <1% by weight) additional isocyanates. That is, only MDI is used to form the HR polyurethane foam of this embodiment.

However, in other embodiments additional isocyanates (in addition to the toluene diisocyanate) may be used to form the HR polyurethane foam. For example, in one embodiment the isocyanate comprises, consists essentially of, or consists of a mixture of MDI/PMDI and TDI.

Suitable isocyanates are commercially available from BASF Corporation of Florham Park, N.J. under the trade name LUPRANATE®.

The isocyanate-reactive component comprises a first and a second polyether polyol. Typically, the first and second polyether polyols are formed via alkoxylation and include a plurality of alkyleneoxy groups. The term alkyleneoxy group describes a mer, or unit. The alkyleneoxy group is the unit which results from the polymerization of the alkylene oxide. The plurality of polymeric side chains typically include alkyleneoxy groups selected from the group of ethyleneoxy groups, propyleneoxy groups, butyleneoxy groups, and combinations thereof. The amount of alkyleneox groups in the polyether polyols is referenced in parts by weight, based on the total weight of the alkyleneoxy groups used to form the polyether polyol. The plurality of alkyleneoxy groups may be arranged to form polyether polyols which are described as polyols having random alkyleneoxy groups (which make up heteric segments), polymers having repeating alkyleneoxy groups, and polymers having blocked alkyleneoxy groups. The plurality of polymeric side chains have alkoxyl end caps selected from the group of ethyleneoxy end caps, propyleneoxy end caps, butyleneoxy end caps, and combinations thereof. The amount of alkyleneoxy end caps in the polyether polyols is referenced in percent (%), based on the total number of end caps in a sample of the particular polyether polyol. For example, if the first polyether polyol comprises 95% propyleneoxy end caps, based on the total number of end caps, 95% of the end caps in a sample of the first polyether polyol terminate with a secondary hydroxyl group formed from propylene oxide.

The first polyether polyol has a weight-average molecular weight of from about 3,500 to about 8,000, alternatively from about 4,000 to about 6,000, g/mol, and a hydroxyl number of from about 20 to about 40, alternatively from about 25 to about 35, mg KOH/g. The first polyether polyol is typically a triol. When the first polyether polyol is a triol, the first polyether polyol has three polymeric side chains. The first polyether polyol typically has a plurality polymeric side chains comprising heteric segments formed from oxyalkylene monomers and a plurality of end caps attached to the plurality of heteric segments. That is, the first polyether polyol typically has heteric side chains which are end-capped. In one embodiment, the first polyether polyol has heteric side chains end-capped with propyleneoxy end caps. i.e., the first polyether polyol is a heteric polyether polyol capped with propyleneoxy end caps. The first polyether polyol typically comprises from about 3.5 to about 25, alternatively from about 5 to about 25, alternatively from about 5 to about 15, parts by weight ethyleneoxy units, based on the total weight of the first polyether polyol. The first polyether polyol typically comprises greater than about 80, alternatively greater than about 85, alternatively greater than about 90, alternatively greater than about 95, alternatively greater than about 98, alternatively greater than about 99, alternatively about 100, % propyleneoxy end caps. In various embodiments, the end caps of the first polyether polyol comprise from about 3.5 to about 20, alternatively from about 5 to about 15, parts by weight ethyleneoxy units based on a total weight of alkyleneoxy units used to form the first polyether polyol. In a typical embodiment, the first polyether polyol has about 100% propyleneoxy end caps. More specifically, by "about" 100% propyleneoxy end caps, it is meant that all intended capping of the first polyether polyol is propyleneoxy capping, with any non-propyleneoxy capping resulting from trace amounts of other alkylene oxides or other impurities. As such, the capping is typically 100% propyleneoxy, but may be slightly lower, such as at least 99% propylene oxide capping, depending on process variables and the presence of impurities during the production of the first polyether polyol. The about 100% propyleneoxy capping provides substantially (about 100%) all secondary hydroxyl groups, which typically react slower than primary hydroxyl groups. The first polyether polyol having about 100% propyleneoxy end capping also typically reacts slower than a polyol having ethyleneoxy end capping, as a propyleneoxy-capped polyol is sterically hindered.

In a preferred embodiment, the first polyether polyol is a triol which includes three side chains comprising an ethyleneoxy/propyleneoxy heteric segment end capped with a propyleneoxy block/segment.

The second polyether polyol is different than the first polyether polyol. The second polyether polyol has a weight-average molecular weight of from about 2,000 to about 6,000, alternatively from about 4,000 to about 6,000, g/mol, and a hydroxyl number of from about 20 to about 56, alternatively from about 20 to about 40, mg KOH/g. The second polyether polyol is typically a triol. In some embodiments, the second polyether polyol has a plurality of internal blocks formed from oxyalkylene monomers and a plurality of end caps attached to the plurality of internal blocks. The second polyether polyol typically has greater than about 15, alternatively greater than about 20, alternatively greater than about 25, parts by weight ethyleneoxy units, based on the total weight of the second polyether polyol. The second polyether polyol typically has greater than 80% ethyleneoxy end caps, alternatively about 100)% ethyleneoxy end caps. In a typical embodiment, the second polyether polyol has about 100% ethyleneoxy end caps. More specifically, by "about" 100% ethyleneoxy end caps, it is meant that all intended capping of the second polyether polyol is ethyleneoxy capping, with any non-ethyleneoxy capping resulting from trace amounts of other alkylene oxides or other impurities. As such, the capping is typically 100% ethyleneoxy, but may be slightly lower, such as at least 99% ethylene oxide capping, depending on process variables and the presence of impurities during the production of the second polyether polyol. The about 100% ethyleneoxy capping provides substantially (about 100%) all primary hydroxyl groups, which typically react faster than secondary hydroxyl groups. The second polyether polyol having about 100% ethyleneoxy capping also typically reacts faster than a polyol having propyleneoxy capping, as a propyleneoxy-capped polyol is sterically hindered.

Suitable first and second polyether polyols are commercially available from BASF Corporation of Florham Park, N.J. under the trade name PLURACOL®.

The first polyether polyol is present in the isocyanate-reactive component in an amount of greater than about 5, alternatively greater than about 10, alternatively in an amount of from about 10 to about 35, parts by weight based on the total weight of the isocyanate-reactive component. The second polyether polyol is present in the isocyanate-reactive component in an amount of less than about 80, alternatively less than about 70, alternatively less than about 60, alternatively less than about 50, parts by weight based on the total weight of the isocyanate-reactive component. Notably, the first polyether polyol and the second polyether polyol may be present in the isocyanate-reactive component in a weight ratio of from about 1:15 to about 1:3, alternatively from about 1:10 to about 1:2.

In certain embodiments, the isocyanate-reactive component further comprises a graft polyol, which denotes dispersed polymer solids chemically grafted to a carrier polyol. The graft polyol is different than the first and second polyether polyols. The graft polyol of the isocyanate-reactive component comprises a carrier polyol and particles of co-polymerized styrene and acrylonitrile, wherein the particles of co-polymerized styrene and acrylonitrile are dispersed in the carrier polyol, as set forth in more detail below. Typically, the carrier polyol of the graft polyol is a polyether polyol. The graft polyol typically has a functionality of from about 2 to about 4, more typically from about 2.5 to about 3.5.

Typically, the carrier polyol of the graft polyol is a polyether polyol. The carrier polyol may be any known polyether polyol in the art and preferably serves as a continuous phase for the dispersed co-polymerized styrene and acrylonitrile particles. That is, the co-polymerized styrene and acrylonitrile particles are dispersed in the carrier polyol to form a dispersion, i.e., to form the graft polyol. In certain embodiments, the carrier polyol is a polyether triol having a weight-average molecular weight of from about 700 to about 20,000, alternatively from about 1,000 to about 6,000, alternatively from about 2,000 to about 5,000, g/mol. The carrier polyol typically has the molecular weight so as to provide the HR polyurethane foam with flexibility and a desired density, as described in greater detail below. The molecular weight of the carrier polyol typically provides randomly-sized, irregular-shaped cells, e.g., cells that differ in both size and shape from neighboring cells.

The particles of co-polymerized styrene and acrylonitrile are dispersed in the carrier polyol in an amount of from about 30 to about 60, alternatively from about 40 to about 55, more alternatively from about 42 to about 50, alternatively about 45 parts by weight of particles based on 100 parts by weight of the carrier polyol.

Suitable graft polyols are commercially available from BASF Corporation of Florham Park, N.J. under the trade name PLURACOL®.

Without intending to be limited by theory, the graft polyol is typically present in the isocyanate-reactive component to provide the HR polyurethane foam with an optimal cross-sectional density and to adjust the solids level of the HR polyurethane foam. The graft polyol also typically contributes to the processability and hardness of the HR polyurethane foam. The graft polyol also allows for optimal cell opening during production of the HR polyurethane foam without having any adverse effects on the resilience of the HR polyurethane foam. Further, it is believed that the graft polyol affects the flame retardance of the HR polyurethane foam of the present invention.

When present, the graft polyol is present in the isocyanate-reactive component in an amount of greater than about 5, alternatively greater than about 10, alternatively from about 20 to about 40, alternatively from about 25 to about 35, parts by weight based on the total weight of the isocyanate-reactive component. The carrier polyol of the graft polyol may comprise the polyether triol illustrated and described above. Additionally, the graft polyol has a hydroxyl number of from about 10 to about 60, alternatively from about 15 to about 40, alternatively from about 15 to about 30, mg KOH/g. Further, the graft polyol has a viscosity of from about 1,000 to about 7,000 centipoise at 25° C., which allows for processing efficiencies such as ease of component mixing, thereby contributing to the cost effectiveness of producing the HR polyurethane foam.

The isocyanate-reactive component may also include other polyols in addition to the first and second polyether polyols, as well as the graft polyol described above. These may include polyester polyols or polyamine polyols. The polyester polyols may be obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Other polyols that may be used include dispersions or solutions of addition or condensation polymers in polyols of the types described above. Such modified polyols, often referred to as polymer polyols, graft polyols, or graft dispersions, can include products obtained by the in-situ polymerization of one or more vinyl monomers, for example styrene and acrylonitrile, in polymeric polyols, for example polyether polyols, or by the in-situ reaction between a polyisocyanate and an amino- or hydroxy-functional compound, such as triethanolamine, in a polymeric polyol.

The isocyanate-reactive component may include an amino alcohol chain extender. The amino alcohol chain extender is typically a low molecular weight, hygroscopic amino alcohol. More specifically, the amino alcohol chain extender typically has a weight-average molecular weight of from about 50 to about 500 g/mol, alternatively from about 75 to about 250 g/mol and a backbone chain with from about 2 to about 8 carbon atoms, alternatively from about 2 to about 6 carbon atoms. In various embodiments, the amino alcohol chain extender is selected from the group of ethanolamine, diethanolamine, triethanolamine, and mixtures thereof. In one embodiment, the amino alcohol chain extender is diethanolamine. However, it is to be appreciated that amino alcohol chain extenders other than those specifically disclosed above may be used in the isocyanate-reactive component.

The isocyanate-reactive component may include a hydrolyzable polydimethylsiloxane copolymer. The hydrolyzable polydimethylsiloxane copolymer hydrolyzes on exposure to water, which is typically included in the isocyanate-reactive component. Without being bound by theory, it is believed that the hydrolyzable polydimethylsiloxane copolymer generates a froth which is sufficient to withstand the exotherm created by the reaction between the TDI and the first and second polyether polyols which allows formation of the HR polyurethane foam of the subject disclosure. Notably, the hydrolyzable polydimethylsiloxane copolymer does not negatively impact the properties of the HR polyurethane foam.

The isocyanate-reactive component also typically includes a blowing agent. During the exothermic reaction of the isocyanate-reactive component and the toluene diisocyanate, the blowing agent promotes the release of a blowing gas which forms voids, or cells, foaming the polyurethane. The blowing agent of the present disclosure may be a physical blowing agent, a chemical blowing agent, or a combination thereof.

The chemical blowing agent chemically reacts with the toluene diisocyanate or with the isocyanate-reactive component. Non-limiting examples of chemical blowing agents that are suitable for the purposes of the subject disclosure include formic acid, water, and combinations thereof. A specific example of a chemical blowing agent that is suitable for the purposes of the subject disclosure is water.

In one embodiment, the blowing agent includes water. Water generates $CO_2$ which foams the polyurethane and also forms urea linkages or "hard segments". The $CO_2$ which is formed from the reaction of the water and the isocyanate can be supplemented with the addition of one or more physical blowing agents.

The physical blowing agent does not chemically react with the isocyanate-reactive component and/or the toluene diisocyanate to provide a blowing gas. The physical blowing agent can be a gas or liquid. The physical blowing agent that is liquid typically evaporates into a gas when heated, and typically returns to a liquid when cooled. Suitable physical blowing agents for the purposes of the subject disclosure may include hydrofluorocarbons (HFCs), hydrocarbons, and combinations thereof.

The isocyanate-reactive component typically includes one or more catalysts. The catalyst(s) is typically present in the isocyanate-reactive component to catalyze the exothermic reaction between the isocyanate-reactive component and the toluene diisocyanate. It is to be appreciated that the catalyst is typically not consumed in, the exothermic reaction between the isocyanate-reactive component and the toluene diisocyanate. That is, the catalyst typically participates in, but is not consumed in the exothermic reaction. Examples of suitable catalysts include, but are not limited to, gelation catalysts, e.g. amine catalysts in dipropylene glycol; blowing catalysts, e.g. bis(dimethylaminoethyl)ether in dipropylene glycol: and metal catalysts, e.g. tin, bismuth, lead, etc. If included, the catalyst can be included in various amounts.

In addition to the catalyst, the isocyanate-reactive component may optionally include one or more surfactants. The surfactant typically supports homogenization of the blowing agent and the polyether polyols and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxane-oxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. If included, the surfactant may be included in the isocyanate-reactive component in various amounts.

The isocyanate-reactive component may optionally include one or more additives. The additive may include any suitable additive or mixtures of additives known in the art. Suitable additives for purposes of the present disclosure include, but are not limited to, cross-linkers, chain-terminators, processing additives, flame retardants, colorant, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate-reactive component in various amounts.

The subject disclosure further provides a method of forming the HR polyurethane foam. The method includes the step of providing the isocyanate and the isocyanate-reactive composition comprising the first and second polyether polyols, all of which are as described above.

The method also includes the step of reacting the isocyanate and the isocyanate-reactive composition to form the HR polyurethane foam. To form the HR polyurethane foam of the subject disclosure, the isocyanate and isocyanate-reactive composition are reacted at an isocyanate index of from about 80 to about 120, alternatively from about 90 to about 110, alternatively from about 95 to about 105. An isocyanate index, as is known in the art, is the ratio of NCO groups in the isocyanate to the OH groups in the polyols of the isocyanate-reactive composition.

The following examples are intended to illustrate the present disclosure and are not to be read in any way as limiting to the scope of the present disclosure.

EXAMPLES

Examples of HR polyurethane foams are formed with Polyols A through J, which are set forth and described in Table 1 below. Comparative Examples of HR polyurethane foams are formed with Polyols C-A, C-B, and C-C, which are also set forth and described in Table 1 below. The molded HR polyurethane foams set forth and described in Tables 2 and 3 further below utilize relatively high molecular weight PO-capped polyols set forth in Table 1 below in lieu of EO-capped polyols, which are required to produce HR polyurethane foam.

TABLE 1

(Exemplary First Polyols)

| Polyol ID | Initiator | End Cap | Funct. | Mol. Weight (g/mol) | % EO | Hydroxyl Number (mg KOH/g) |
|---|---|---|---|---|---|---|
| A | GLY[1] | PO | 3.0 | 5000 | 9 | 34.1 |
| B | GLY | PO | 3.0 | 5000 | 25 | 32.4 |
| C | GLY/DPG[2] | PO | 2.6 | 5000 | 9 | 31.3 |
| D | GLY/DPG | PO | 2.6 | 5500 | 25 | 29.3 |
| E | GLY/DPG | PO | 2.6 | 5500 | 9 | 29.8 |
| F | GLY/DPG | PO | 2.6 | 5500 | 7 | 29.9 |
| G | GLY/DPG | PO | 2.6 | 5500 | 5 | 28.4 |
| H | GLY/DPG | PO | 2.6 | 5500 | 3.5 | 27.9 |
| I | GLY/DPG | PO | 2.6 | 5500 | 0 | 28.3 |
| J | TMP[3]/DPG | PO | 2.6 | 5500 | 7 | 27.6 |
| C-A | GLY | PO | 3.0 | 3000 | 10 | 56 |
| C-B | GLY | PO/EO | 3.0 | 3000 | 25 | 56 |
| C-C | GLY | PO | 3.0 | 3000 | 7 | 56 |

[1]Glycerin
[2]Dipropyleneglycol
[3]Trimethylpropane

Referring now to Tables 2 and 3, Examples 1 through 10 are described. Examples 1 through 10 are HR polyurethane foams formed in accordance with the instant disclosure. The amount and type of each component used to form each Example is indicated in Tables 2 and 3 with all values in parts by weight, based on 100 parts by weight of the Isocyanate-reactive Component.

TABLE 2

| Component | Ex. 1a | Ex. 1b | Ex. 2a | Ex. 2b | Ex. 3a | Ex. 3b | Ex. 4a | Ex. 4b | Ex. 5a | Ex. 5b |
|---|---|---|---|---|---|---|---|---|---|---|
| Isocyanate-reactive Component | | | | | | | | | | |
| Polyol A | 5 | 20 | — | — | — | — | — | — | — | — |
| Polyol B | — | — | 5 | 20 | — | — | — | — | — | — |
| Polyol C | — | — | — | — | 5 | 25 | — | — | — | — |
| Polyol D | — | — | — | — | — | — | 5 | 20 | — | — |
| Polyol E | — | — | — | — | — | — | — | — | 5 | 30 |
| Polyol K (Second Polyol) | 73 | 58 | 73 | 58 | 73 | 58 | 73 | 58 | 73 | 58 |
| Polyol L (Graft Polyol) | 22 | 22 | 22 | 22 | 22 | 22 | 22 | 22 | 22 | 22 |
| Catalyst A | 1.40 | 1.40 | 1.40 | 1.40 | 1.40 | 1.40 | 1.40 | 1.40 | 1.40 | 1.40 |
| Catalyst B | 0.32 | 0.32 | 0.32 | 0.32 | 0.32 | 0.32 | 0.32 | 0.32 | 0.32 | 0.32 |
| Catalyst C | 0.08 | 0.08 | 0.08 | 0.08 | 0.08 | 0.08 | 0.08 | 0.08 | 0.08 | 0.08 |

TABLE 2-continued

| Component | Ex. 1a | Ex. 1b | Ex. 2a | Ex. 2b | Ex. 3a | Ex. 3b | Ex. 4a | Ex. 4b | Ex. 5a | Ex. 5b |
|---|---|---|---|---|---|---|---|---|---|---|
| Water | 4.07 | 4.07 | 4.07 | 4.07 | 4.07 | 4.07 | 4.07 | 4.07 | 4.07 | 4.07 |
| Surfactant A | 1.00 | 1.00 | 1.00 | 1.00 | 1.00 | 1.00 | 1.00 | 1.00 | 1.00 | 1.00 |
| Isocyanate | | | | | | | | | | |
| TDI Index | 100 | 100 | 100 | 100 | 100 | 100 | 100 | 100 | 100 | 100 |

Polyols A through E are described in Table 1.
Polyol K is an EO-end capped polyol.
Polyol L is a graft polyol.
Catalyst A is Diethanol amine.
Catalyst B is a solution of 33% by weight triethylenediamine and 67% by weight dipropylene glycol.
Catalyst C is 70% bis(2-Dimethylaminoethyl) ether diluted with 30% dipropylene glycol.
Surfactant A is a silicone glycol copolymer.
Isocyanate is toluene diisocyanate (TDI).

TABLE 3

| Component | Ex. 6a | Ex. 6b | Ex. 7a | Ex. 7b | Ex. 8a | Ex. 8b | Ex. 9a | Ex. 9b | Ex. 10a | Ex. 10b |
|---|---|---|---|---|---|---|---|---|---|---|
| HR Isocyanate-reactive Component | | | | | | | | | | |
| Polyol F | 5 | 20 | — | — | — | — | — | — | — | — |
| Polyol G | — | — | 5 | 20 | — | — | — | — | — | — |
| Polyol H | — | — | — | — | 5 | 20 | — | — | — | — |
| Polyol I | — | — | — | — | — | — | 5 | 20 | — | — |
| Polyol J | — | — | — | — | — | — | — | — | 5 | 20 |
| Polyol K (Second Polyol) | 73 | 58 | 73 | 58 | 73 | 58 | 73 | 58 | 73 | 58 |
| Polyol L (Graft Polyol) | 22 | 22 | 22 | 22 | 22 | 22 | 22 | 22 | 22 | 22 |
| Catalyst A | 1.40 | 1.40 | 1.40 | 1.40 | 1.40 | 1.40 | 1.40 | 1.40 | 1.40 | 1.40 |
| Catalyst B | 0.32 | 0.32 | 0.32 | 0.32 | 0.32 | 0.32 | 0.32 | 0.32 | 0.32 | 0.32 |
| Catalyst C | 0.08 | 0.08 | 0.08 | 0.08 | 0.08 | 0.08 | 0.08 | 0.08 | 0.8 | 0.08 |
| Water | 4.07 | 4.07 | 4.07 | 4.07 | 4.07 | 4.07 | 4.07 | 4.07 | 4.07 | 4.07 |
| Surfactant A | 1.00 | 1.00 | 1.00 | 1.00 | 1.00 | 1.00 | 1.00 | 1.00 | 1.00 | 1.00 |
| Isocyanate | | | | | | | | | | |
| TDI Index | 100 | 100 | 100 | 100 | 100 | 100 | 100 | 100 | 100 | 100 |

All of the components in Table 3 are described in Table 1 and in reference to Table 2.

Referring now to Table 4, Comparative Examples 1 and 2 are described. Comparative Examples 1 and 2 are HR polyurethane foams which are not formed in accordance with the instant disclosure, and are included for comparative purposes. The amount and type of each component used to form these comparative examples is indicated in Table 4 with all values in parts by weight, based on 100 parts by weight of the Isocyanate-reactive Component.

TABLE 4

| Component | Comp. Ex. 1 | Comp. Ex. 2 | Ex. 6b |
|---|---|---|---|
| Isocyanate-reactive Component | | | |
| Polyol I | — | — | 20 |
| Polyol C-A | 5 | — | — |
| Polyol K (Second Polyol) | 73 | 78 | 58 |
| Polyol L (Graft Polyol) | 22 | 22 | 22 |
| Catalyst A | 1.40 | 1.40 | 1.40 |
| Catalyst B | 0.32 | 0.32 | 0.32 |
| Catalyst C | 0.08 | 0.08 | 0.08 |
| Water | 4.07 | 4.07 | 4.07 |
| Surfactant A | 1.00 | 1.00 | 1.00 |
| Isocyanate | | | |
| TDI Index | 100 | 100 | 100 |

Examples 1 through 10 and Comparative Examples 1 and 2 are tested for density (g/cm$^3$), tensile strength (PSI), elongation (%), tear graves (ppi), IFD (%), and resilience (%) (all key performance properties for HR polyurethane foam). Surprisingly, when Polyol K, which is EO-end capped, is partially displaced with Polyols A-1, which are higher molecular weight polyether polyols having PO/EO-heteric chains and PO end caps, in the HR Isocyanate-reactive Component, Polyols A-I could be utilized in the HR Isocyanate-reactive Component at a loading of up to 30% by weight, based on 100 parts by weight of the HR Isocyanate-reactive Component without negatively impacting the performance properties of the HR polyurethane foams formed therefrom. However, when Polyol K, which is EO-end capped, is partially displaced with comparative polyols C-A, C-B, and C-C, which are lower molecular weight polyether polyols having PO/EO-heteric chains and PO end caps, in an HR Isocyanate-reactive Component, these comparative polyols could only be utilized in the HR Isocyanate-reactive Component at a loading of up to 5% by weight, based on 100 parts by weight of the HR Isocyanate-reactive Component without sacrificing performance properties in the HR polyurethane foams formed therefrom.

For example, Table 5 sets forth the performance properties of HR Polyurethane Example 6b which is formed with an HR Isocyanate-reactive Component including Polyol F in an amount of 20% by weight, based on 100 parts by weight of the HR Isocyanate-reactive Component (20% of Polyol K is displaced). Table 5 also sets forth the performance properties of Comparative Examples 1 and 2. Comparative Example 1 is formed with an HR Isocyanate-reactive Component including Polyol C-A in an amount of just 5% by weight, based on 100 parts by weight of the HR Isocyanate-reactive Component (only 5% of Polyol K is displaced). Comparative Example 2 is formed with an HR Isocyanate-reactive Component including 78% Polyol K, based on 100 parts by weight of the HR Isocyanate-reactive Component (none of the Polyol K is displaced). Example 6b of Table 5 demonstrates that Polyol K, which is EO-end capped, can be partially displaced with 20% Polyol F, which is relatively high molecular weight (5500 g/mol) and PO-end capped, to form molded HR foam which exhibits excellent performance properties. In contrast. Comparative Example 1 demonstrates that no more than 5% of Polyol K can be replaced with polyol C-A (3000 g/mol) to form molded HR foam which exhibits excellent performance properties. Comparative Example 2 is a control example HR polyurethane foam which exhibits excellent performance properties.

TABLE 5

|  | HR Polyurethane Foam Ex. 6b | HR Polyurethane Foam Comp. Ex. 1 | HR Polyurethane Foam Comp. Ex. 2 |
|---|---|---|---|
| Notes | 20% Polyol F and 58% Polyol K | 5% Polyol C-A and 73% Polyol K | 0% Polyol F and 78% Polyol K |
| Density, PCF ASTM D1622 | 1.8 | 1.9 | 1.8 |
| Tensile, PSI ASTM D3574-11 | 18 | 16 | 17 |
| Elongation, % ASTM D3574-11 | 89 | 79 | 88 |
| Tear, ppi ASTM D3574-11 | 3.2 | 3.3 | 3.4 |
| IFD, LBS/50 SQ. IN. (4 INCH) ASTM D3574-11 | | | |
| SI1 25% IFD, % Loss | 28 | 28 | 29 |
| SI1 65% IFD, % Loss | 77 | 79 | 76 |
| Resilience ASTM D3574-11 | | | |
| Resilience, % | 52 | 50 | 52 |
| Resilience, % 50% Humidity Aged | 26 | 26 | 25 |

Further, with respect to slab HR polyurethane foam systems (as opposed to molded HR polyurethane foam systems which are described in the Examples above), a first polyol (as is set forth in Table 1 above) can be utilized in an HR Isocyanate-reactive Component to replace Polyol K, which is EO-end capped. The first polyol is a relatively high molecular weight PO-end capped polyol, examples of which are described in Table 1. Referring now to Table 6, when Polyol K is partially displaced with the relatively high molecular weight PO-end capped polyols (the first polyol), a wider processing window for tin catalysts is generally observed.

TABLE 6

| Example | Amount of Polyol K Typically Required to Make an HR Polyurethane Foam (% by weight) | Amount of Polyol K Required to Make an HR Polyurethane Foam According to the Subject Invention (% by weight) | Titanium Catalyst Range |
|---|---|---|---|
| A | 45 | 19 | + |
| B | 26 | 6 | – |
| C | 34 | 24 | ++ |
| D | 14 | — | |
| E | 26 | 19 | ++ |
| F | 41 | 27 | +++ |
| G | — | — | |
| H | 34 | 6 | ++ |
| I | 41 | 6 | + |
| J | 34 | 19 | ++ |
| C-A | 51 | 6 | – |
| C-B | 64 | 6 | – |
| C-C | 58 | 13 | + |

In Table 6 above, the first column represents the amount of polyol K typically required to make an HR foam having adequate physical properties. The second column represents the amount of polyol K required to make the HR polyurethane foam having adequate physical properties of the subject invention. The third column represents a range of tin catalyst that can be used with the amount of polyol K set forth in the second column to make an HR polyurethane in accordance with the subject invention. More specifically, "+" represents a wider range of tin catalyst which can be used to obtain an HR polyurethane foam having adequate physical properties while a "–" represents a more narrow range of tin catalyst which can be used to obtain an HR polyurethane foam having adequate physical properties. The wider the range of tin catalyst that can be used, the more robust the method of making the HR polyurethane foam. As such, a "+" is positive, and a "–" is negative. Generally, the HR polyurethane foam of the subject invention can be made with non-EO capped polyol (less EO-capped polyol, i.e. Polyol K) and with greater variances in the amount of tin catalyst used.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A high-resiliency polyurethane foam comprising a reaction product of:
   (A) an isocyanate; and
   (B) an isocyanate-reactive component comprising:
   i) a first polyether polyol containing alkyleneoxy units having a weight-average molecular weight of from about 4,000 to about 6,000 g/mol, a hydroxyl number of about 25 to about 35 mg KOH/g, and present in an amount of greater than about 5 to about 30 parts by weight based on the total weight of said isocyanate-reactive component, said first polyether polyol comprising:
      a) from about 3.5 to about 25 parts by weight ethyleneoxy units, based on the total weight of alkyleneoxy units used to form said first polyether polyol; and
      b) greater than about 95% propyleneoxy end caps based on a total number of end caps present in said first polyether polyol wherein said end caps comprise from about 3.5 to about 20 parts by weight propyleneoxy units based on the total weight of alkyleneoxy units used to form said first polyether polyol; and
   ii) a second polyether polyol, different from said first polyether polyol, having a weight-average molecular weight of from about 2,000 to about 6,000 g/mol and present in an amount of less than about 80 parts by weight based on the total weight of the isocyanate-reactive component, said second polyether polyol comprising about 100% ethyleneoxy end caps based on a total number of end caps present in said second polyether polyol and greater than about 25 parts by weight ethyleneoxy units based on the total weight of the second polyether polyol;
   iii) a graft polyol;
   wherein said high-resiliency polyurethane foam has a density of from about 1.5 to about 10 pcf and a resilience of about 45 to about 70% when tested in accordance with ASTM D3574-11.

2. A high-resiliency polyurethane foam as set forth in claim 1 wherein said first polyether polyol comprises from about 5 to about 15 parts by weight ethyleneoxy units, based on the total weight of alkyleneoxy units used to form said first polyether polyol.

3. A high-resiliency polyurethane foam as set forth in claim 1 wherein said first polyether polyol comprises greater than about 99% propyleneoxy end caps based on a total number of end caps present in said first polyether polyol.

4. A high-resiliency polyurethane foam as set forth in claim 1 wherein said first polyether polyol comprises about 100% propyleneoxy end caps based on a total number of end caps present in said first polyether polyol.

5. A high-resiliency polyurethane foam as set forth in claim 1 wherein said end caps of said first polyether polyol comprise from about 5 to about 15 parts by weight propyleneoxy units, based on the total weight of alkyleneoxy units used to form said first polyether polyol.

6. A high-resiliency polyurethane foam as set forth in claim 4 wherein said first polyether polyol is a heteric polyether polyol capped with propyleneoxy end caps.

7. A high-resiliency polyurethane foam as set forth in claim 1 wherein said first polyol is present in said isocyanate-reactive component in an amount of from about 10 to about 35 parts by weight based on the total weight of said isocyanate-reactive component.

8. A high-resiliency polyurethane foam as set forth in claim 1 wherein said second polyether polyol has a weight-average molecular weight of from about 4,000 to about 6,000 g/mol.

9. A high-resiliency polyurethane foam as set forth in claim 1 wherein said second polyether polyol is present in said isocyanate-reactive component in an amount of less than about 60 parts by weight based on the total weight of said isocyanate-reactive component.

10. A high-resiliency polyurethane foam as set forth in claim 1 wherein said first polyether polyol and said second polyether polyol are present in said isocyanate-reactive component in a weight ratio of from about 1:10 to about 1:2.

11. A high-resiliency polyurethane foam as set forth in claim 1 wherein the graft polyol includes co-polymerized styrene and acrylonitrile.

12. A high-resiliency polyurethane foam as set forth in claim 11 wherein said graft polyol is present in said isocyanate-reactive component in an amount of from about 20 to about 40 parts by weight based on the total weight of said isocyanate-reactive component.

13. A high-resiliency polyurethane foam as set forth in claim 1 wherein said isocyanate comprises toluene diisocyanate.

14. A high-resiliency polyurethane foam as set forth in claim 1 wherein said isocyanate comprises diphenylmethane diisocyanate and/or polymeric diphenylmethane diisocyanate.

15. A high-resiliency polyurethane foam as set forth in claim 1 having a support factor of greater than 2 when tested in accordance with ASTM D3574.

16. A high-resiliency polyurethane foam as set forth in claim 1 having a resilience of about 48 to about 60% when tested in accordance with ASTM D3574-11.

17. A method of forming a high-resiliency polyurethane foam comprising the steps of:
   providing an isocyanate;
   providing an isocyanate-reactive component comprising:
      i) a first polyether polyol containing alkyleneoxy units having a weight-average molecular weight of from about 4,000 to about 6,000 g/mol, a hydroxyl number of about 25 to about 35 mg KOH/g, and present in an amount of greater than about 5 to about 30 parts by weight based on the total weight of said isocyanate-reactive component, said first polyether polyol comprising:
         a) from about 3.5 to about 25 parts by weight ethyleneoxy units, based on the total weight of alkyleneoxy units used to form said first polyether polyol; and
         b) greater than about 95% propyleneoxy end caps based on a total number of end caps present in said first polyether polyol wherein said end caps comprise from about 3.5 to about 20 parts by weight propyleneoxy units based on the total weight of alkyleneoxy units used to form said first polyether polyol; and
      ii) a second polyether polyol, different from said first polyether polyol, having a weight-average molecular weight of from about 2,000 to about 6,000 g/mol and present in an amount of less than about 80 parts by weight based on the total weight of the isocyanate-reactive component, said second polyether polyol comprising about 100% ethyleneoxy end caps based on a total number of end caps present in said second polyether polyol and greater than about 25 parts by weight ethyleneoxy units based on the total weight of the second polyether polyol;
      iii) a graft polyol;
   reacting the isocyanate and the isocyanate-reactive component to form the high-resiliency polyurethane foam;
   wherein said high-resiliency polyurethane foam has a density of from about 1.5 to about 10 pcf and a resilience of about 45 to about 70% when tested in accordance with ASTM D3574-11.

18. A method as set forth in claim 17 wherein the first polyol is present in the isocyanate-reactive component in an amount of from about 15 to about 30 parts by weight and/or the second polyether polyol is present in the isocyanate-reactive component in an amount of less than about 60 parts by weight, with all parts by weight based on the total weight of the isocyanate-reactive component.

19. A method as set forth in claim 18 wherein the isocyanate and the first and the second polyether polyols are reacted at an isocyanate index of from about 80 to about 120.

* * * * *